(12) United States Patent  (10) Patent No.: US 7,227,470 B2
Nedblake  (45) Date of Patent: Jun. 5, 2007

(54) RFID LABEL APPLICATION SYSTEM

(75) Inventor: Jeffrey B. Nedblake, Parkville, MO (US)

(73) Assignee: Lasersoft Americas Limited Partnership, Kansas City, MO (US)

( * ) Notice: Subject to any disclaimer, the term of this patent is extended or adjusted under 35 U.S.C. 154(b) by 203 days.

(21) Appl. No.: 11/100,245

(22) Filed: Apr. 6, 2005

(65) Prior Publication Data

US 2005/0219051 A1    Oct. 6, 2005

Related U.S. Application Data

(63) Continuation-in-part of application No. 10/818,965, filed on Apr. 6, 2004, now abandoned.

(51) Int. Cl.
*G08B 13/14*  (2006.01)

(52) U.S. Cl. .................................. 340/572.1; 340/10.1

(58) Field of Classification Search .. 340/572.1–572.8, 340/10.1; 156/64, 152, 230, 256
See application file for complete search history.

(56) References Cited

U.S. PATENT DOCUMENTS

| 62,119 A | 2/1867 | Hohberger et al. | |
|---|---|---|---|
| 62,131 A | 2/1867 | Hohberger et al. | |
| 145,945 A | 12/1873 | Kennedy | |
| 5,679,199 A * | 10/1997 | Nedblake et al. | 156/254 |
| 5,867,102 A | 2/1999 | Souder et al. | 340/572 |
| 5,897,741 A | 4/1999 | Mills et al. | 156/541 |
| 6,024,830 A * | 2/2000 | Nedblake et al. | 156/353 |
| 6,103,989 A * | 8/2000 | Jennings et al. | 219/121.67 |
| 6,123,796 A | 9/2000 | Kathmann et al. | 204/263 |
| 6,162,550 A | 12/2000 | Pinchen et al. | 428/624 |
| 6,281,795 B1 | 8/2001 | Smith et al. | 340/572.1 |
| 6,334,921 B1 | 1/2002 | Duschek | 156/230 |
| 6,451,154 B1 | 9/2002 | Grabau et al. | 156/300 |
| 6,527,888 B2 | 3/2003 | Williams et al. | 156/64 |
| 6,603,399 B1 | 8/2003 | Ruhrig | 340/572.1 |
| 6,627,031 B1 | 9/2003 | Pinchen et al. | 156/251 |
| 2002/0168212 A1* | 11/2002 | Nedblake et al. | 400/621 |
| 2002/0195194 A1 | 12/2002 | Grabau et al. | 156/300 |
| 2002/0195195 A1 | 12/2002 | Grabau et al. | 156/300 |
| 2003/0136503 A1 | 7/2003 | Green et al. | 156/264 |

OTHER PUBLICATIONS

Cathy Booth-Thomas, The See-It-All Chip, Time Global Business, Oct. 2003, pp. A8, A10, A12, A14, & A16.

* cited by examiner

*Primary Examiner*—Phung T. Nguyen
(74) *Attorney, Agent, or Firm*—Hovey Williams LLP

(57) ABSTRACT

A method of tracking and identifying a plurality of items using a label containing an electronic article surveillance (EAS) device such as an RFID tag. An EAS device-containing label is attached to at least one, but less than all, of the items. At least one identifying indicium is stored on the EAS device pertaining to the plurality items. Apparatus for in-line production and application of EAS device-label composites is also described.

17 Claims, 4 Drawing Sheets

RFID LABEL APPLICATION SYSTEM

CROSS REFERENCE TO RELATED APPLICATION

This is a continuation-in-part of application Ser. No. 10/818,965, filed Apr. 6, 2004 now abandoned, which is incorporated by reference.

BACKGROUND OF THE INVENTION

1. Field of the Invention

The present invention is directed toward a method of identifying a plurality of items using labels containing electronic article surveillance (EAS) devices. More specifically, the method pertains to forming a packaging unit comprising a plurality of items, at least one but less than all of which have a label containing an EAS device applied thereto. In another aspect, the invention is directed to methods and apparatus for efficient in-line production and product application of EAS (preferably RFID) bearing labels.

2. Description of the Prior Art

The tracking and identification of products from the manufacturer to the retailer is an important and vital business operation. In the context of large retailers, knowing exact quantities of inventory and where it is located at any given time is essential to the proper distribution of goods throughout its retail network. Furthermore, tight inventory control has the added benefit of deterring theft of goods during the distribution process.

EAS devices have been employed to assist in theft prevention at the retail level for many years. EAS devices are applied to individual items and are then removed or deactivated upon purchase of a particular item. If the consumer attempts to remove the item from the store while the EAS device is active, sensing equipment usually located proximate the store exit detects the active EAS device and sounds an alarm. This method of product monitoring has the disadvantages in that the EAS device is oftentimes visible to the potential thief who may remove it from the product prior to exiting the store thereby circumventing the EAS security system. Furthermore, application of the EAS devices to the product can damage the overall aesthetics of the product.

Radio frequency identification (RFID) tags have the capability to store information related to a product on an integrated circuit. The information is retrieved through an RFID interrogation device. Applying RFID tags to individual devices has the drawback of being relatively expensive in that the tags themselves can be costly and numerous checks must be performed through the manufacturing and tag application process to prevent application of a defective tag to a product.

Methods and apparatus for the production of RFID-bearing labels have been previously described. For example, U.S. Pat. Nos. 6,451,154; 6,334,921; 5,897,741; 6,281,795; 6,162,550; 5,867,102; and 6,527,888, as well as U.S. Published Applications 2002/0195194, 2002/0195195, and 2003/0136503 are exemplary references of this character. However, these references do not teach or suggest methods wherein RFID-bearing labels are created in-line and then immediately applied to products, which limits the utility and commercial desirability of these prior proposals.

There is a real an unfulfilled need in the art for a method of tracking and identifying items which is less expensive than application of RFID tags to each individual product and less susceptible to circumvention by would-be thieves. Additionally, the art fails to teach commercially optimum techniques for the production and immediate application of EAS or RFID-bearing labels.

SUMMARY OF THE INVENTION

The present invention overcomes the above problems and provides a method of identifying and tracking a plurality of items and comprises applying a label containing an EAS device to at least one but less than all of the items. The items are then combined into a packaging unit. The EAS device contains at least one indicium capable of identifying the plurality of items or identifying a characteristic of the items. RFID tags are especially preferred EAS devices for use with the invention.

In particularly preferred embodiments, the RFID tag is programmed (i.e., the indicium capable of identify the items is written or provided to the tag) prior to the application of the label to the item. Alternatively, the programming step occurs at some point after the label has been applied to the item, but preferably prior to combining the items into a packaging unit.

An RFID interrogating device is used to retrieve the identifying indicium contained on the RFID tag. Preferably, the RFID tag stores at least one piece of data related to the items such as a serial number which is associated with an actual description of the items that is stored in a remote database, an actual description of the items, the date of manufacture of the items, the present location and/or destination of the items, or the quantity of items present in the packaging unit.

The present invention is particularly useful in the tracking and identification of packaging units containing bulk quantities of items throughout the manufacturing and distribution stages of the items. In one aspect, a plurality of products are packaged together in a common container. At least one but less than all of the products has a label containing an EAS device (preferably an RFID tag) applied thereto. The EAS device on the at least one item contains an identifying indicium related to the plurality of products. At any stage during the manufacturing and distribution stages, the EAS device may be interrogated in order to retrieve the indicium contained thereon.

In another aspect, the packaging unit comprises a plurality of containers, each of which contains a plurality of individual products. In this aspect, at least one but less than all of the containers has a label including an RFID tag applied thereto. In particularly preferred embodiments, none of the individual products have RFID tags applied thereto. In this manner, large quantities of products may be tracked and identified efficiently and cost effectively without the need for placing an EAS device on each individual product.

Systems for identifying a plurality of items in accordance with the present invention comprise a packaging unit comprising a plurality of items, at least one but less than all of the items having a label containing an RFID tag applied thereto, and an RFID tag interrogating device capable of interrogating the RFID tag. The RFID tag contains at least one indicium capable of identifying the plurality of items. The interrogating device is operable to retrieve the at least one indicium contained on the RFID tag. Preferably, the packaging unit comprises a plurality of individual products placed in a common container. However, in certain preferred embodiments, the packaging unit comprises a plurality of containers, each of which contains a plurality of individual products. In such instance, preferably none of the individual products inside the containers have RFID tags applied thereto.

The present invention has the advantage in that it is not necessary to apply RFID tags to each individual item thereby resulting in significant cost savings. Furthermore, circumvention of security systems by placing the RFID tag on a product inside a container is much more difficult as the container would need to be opened and the at least one product containing the RFID tag identified. As the RFID tag is preferably applied to the product label, such identification would require close inspection of each item.

The invention also provides improved methods and apparatus for the in-line production and application of EAS device-bearing labels. Thus, a supply of spaced apart EAS devices supported on an elongated web is provided, and such is serially moved through an interrogation station and a cutting station in order to ascertain whether each of the devices is operable and to cut the web to create discrete devices. After cutting, the respective devices are alternately directed along a product application path if operable, or along a waste path if inoperable. The operable devices are married with corresponding labels to form EAS device-label composites, and the composites are thereupon immediately applied to products.

In addition to being in-line, the inventive methods and apparatus can be modified to create truly "on-demand" EAS device-bearing labels. In this particular aspect, instead of supplying prefabricated EAS devices and/or prefabricated labels, these objects can be created as a part of the system from the appropriate stock materials. Creating labels on-demand for particular products allows for rapid product line changes with relatively little down time as the need to change label and other supply spools is eliminated.

DETAILED DESCRIPTION OF THE DRAWINGS

The following description sets forth preferred embodiments of the present invention. It is to be understood, however, that this description is provided by way of illustration and nothing therein should be taken as a limitation upon the overall scope of the invention.

Figure 1:
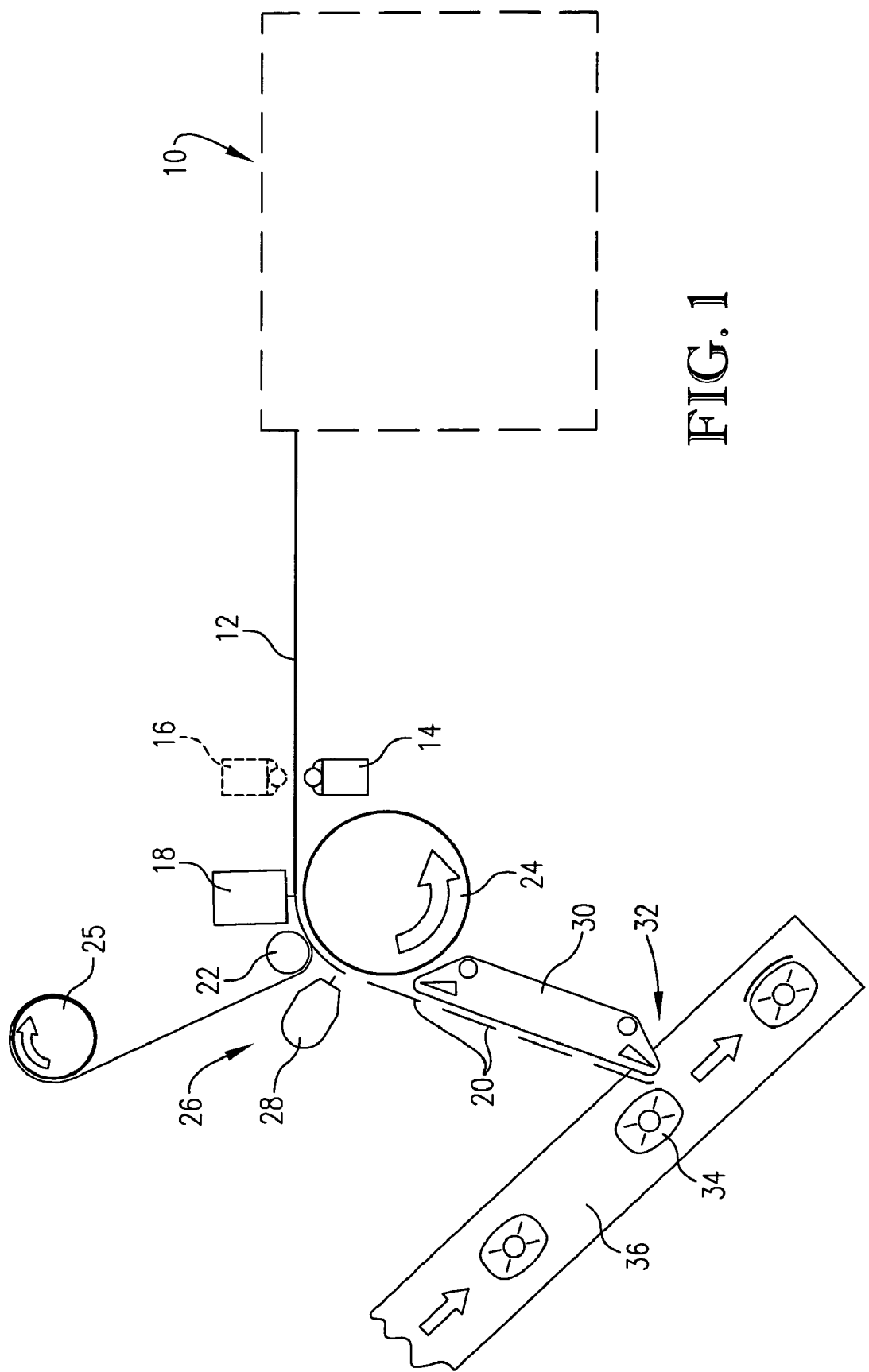
FIG. 1 is a schematic diagram of an apparatus for selective application of EAS devices to labels and application of the labels to products.

Turning now to the drawings, and in particular FIG. 1, a method of selective application of EAS device-containing labels to products is shown. A web supply station 10 is provided. In certain embodiments, station 10 may simply comprise a continuous web of printed images, from which labels may be cut. Station 10 may also comprise a system for on-demand production of printed images. Examples of such on-demand systems are illustrated in U.S. Pat. No. 6,598,531 and U.S. patent application Ser. No. 10/365,167, both of which are incorporated by reference herein.

A continuous web 12 of pressure sensitive material having images printed thereon exits station 10 and is fed past an image sensor 14. Sensor 14 optically scans each image printed on the label in order to determine whether that particular image is defective in some manner. Optional sensor 16 may also be provided to examine the opposite side of web 12 for defects. Web 12 continues to a laser cutting device 18. Cutting device 18 receives a signal from sensor 14 and/or sensor 16 instructing device 18 to cut or not to cut the particular image that is before it. Device 18 then selectively laser cuts the images from web 12 thereby forming individual cut labels 20. The direction of travel of web 12 is changed as web 12 is directed around roller 22. Cut labels 20 adhere to drum 24, which may be either a vacuum or static drum while web 12 is taken up onto waste roll 25. Drum 24 directs labels 20 past EAS device application station 26 where EAS device applicator 28 applies an EAS device, preferably an RFID tag, to at least one but less than all of the labels directed past station 26. Applicator 28 may be pre-programmed so that it applies an EAS device to labels randomly or at fixed intervals, such as to every $3^{rd}$, $6^{th}$, or $12^{th}$ label. Cost savings are realized with the present invention in that at least some labels 20 do not receive an EAS device.

It is to be understood that it is also within the scope of the present invention to provide a pre-fabricated roll of labels having EAS-devices attached to at least one but less than all of the labels contained therein. The EAS-devices may be applied to the labels randomly or at fixed intervals.

Labels 20 are then transferred to a belt device 30 (static or vacuum) for transport to a label application station 32. A plurality of products 34 are provided on conveyor 36 and directed toward station 32 where labels 20 are applied to products 34. The labeled products 34 are then sent to a packaging station (not shown) and prepared for shipping.

Figure 2A:
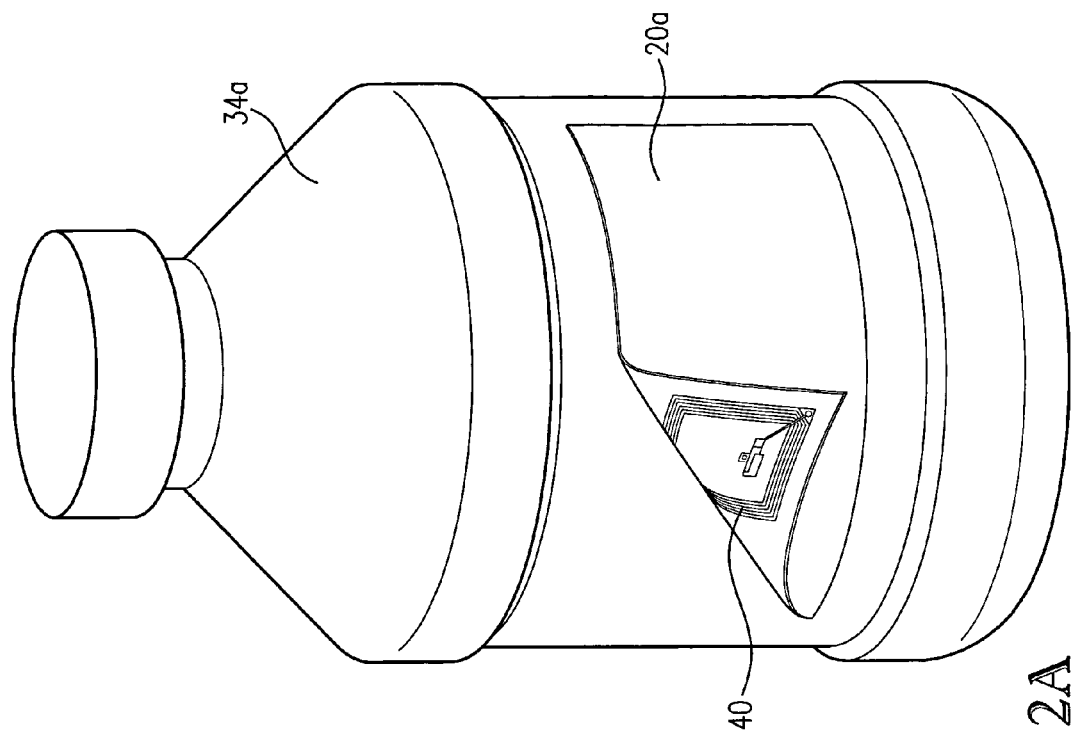
FIG. 2A is a close-up view of a product from FIG. 2 that bears an RFID-containing label.
Figure 2:
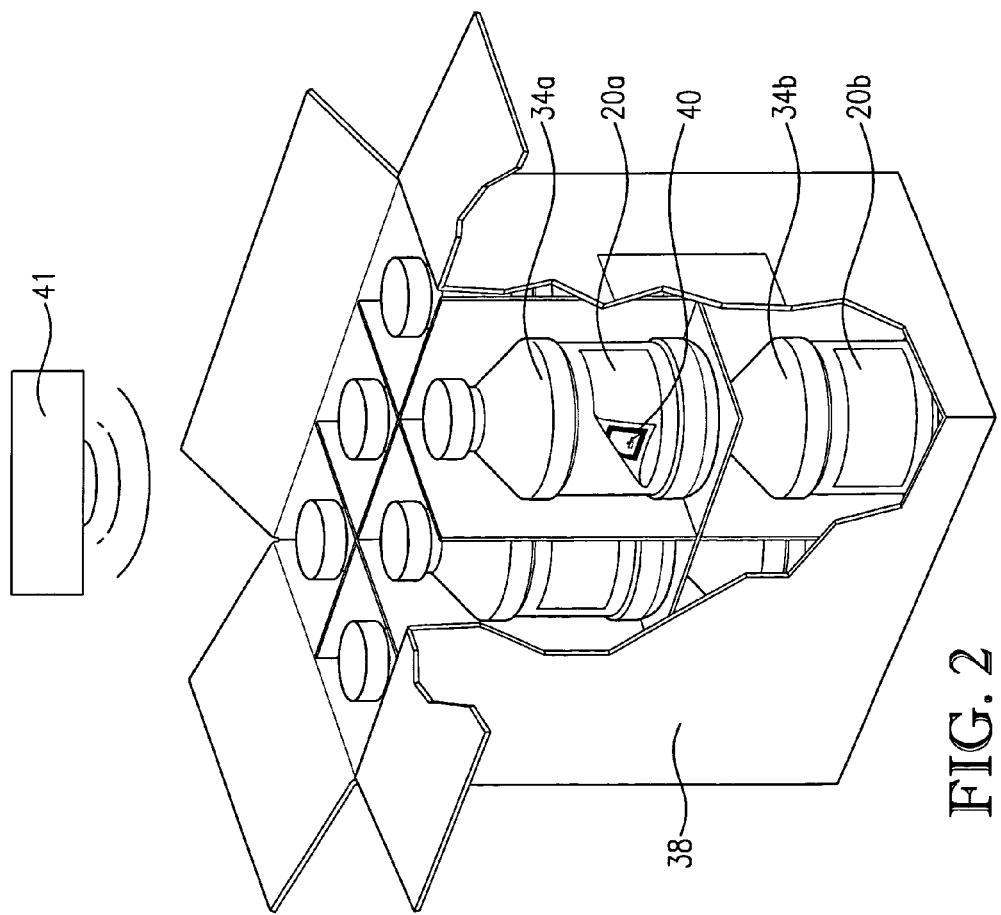
FIG. 2 is a cut away view of a plurality of products packaged in a common container, showing that at least one but less than all of the products bears and RFID-containing label.

FIG. 2 shows an exemplary packaging arrangement wherein eight products 34 have been packaged in a box 38. Box 38 contains a product 34a that bears a label 20a including an RFID tag 40. Note, however, that product 34b contains a label 20b that does not include an RFID tag. RFID tag 40 contains at least one indicium for identifying the products 34 contained within box 38. The indicium may be programmed into the RFID tag circuitry prior to its application to label 20a, after its application to label 20a but prior to application of label 20a to product 34a or after label 20a is applied to product 34a. The indicium programmed may be any useful information capable of identifying the products 34 such as a serial number which is associated with an actual description of the products that is stored in a remote database, an actual description of the products, the date of manufacture of the products, the present location and/or destination of the products, or the quantity of products present in box 38.

Any time after programming of RFID tag 40, the indicum contained thereon may be retrieved by an RFID interrogator 41. For example, as box 38 is loaded onto a truck for transport to a remote warehouse, RFID tag 40 may be interrogated and the indicium noted so that the location of box 38 may be tracked. Likewise, RFID tag 40 may be interrogated upon arrival of box 38 at the warehouse and the new location of box 38 noted in a tracking system.

FIG. 2A is merely a close-up view of product 34a having an RFID tag-containing label 20a attached thereto. As shown, it is preferable for the RFID tag 40 to be flexible and present as small a profile as possible so that it is difficult to visually detect while label 20a is affixed to product 34a. The more difficult it is to identify which product bears the RFID tag-containing label 20a, the more difficult for a would-be thief to circumvent the increased security the present invention affords.

Figure 3:
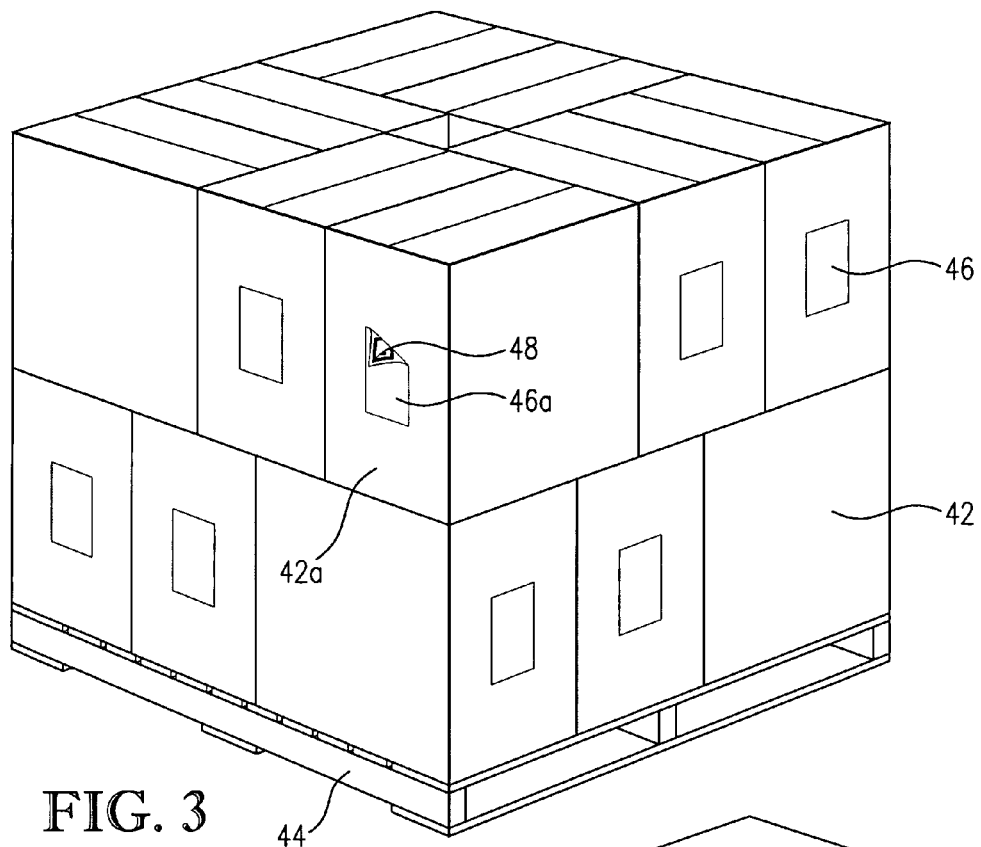
FIG. 3 is a drawing of a plurality of packages placed on a pallet, at least one but less than all of the packages has an RFID-containing label affixed to the outside thereof.
Figure 3A:
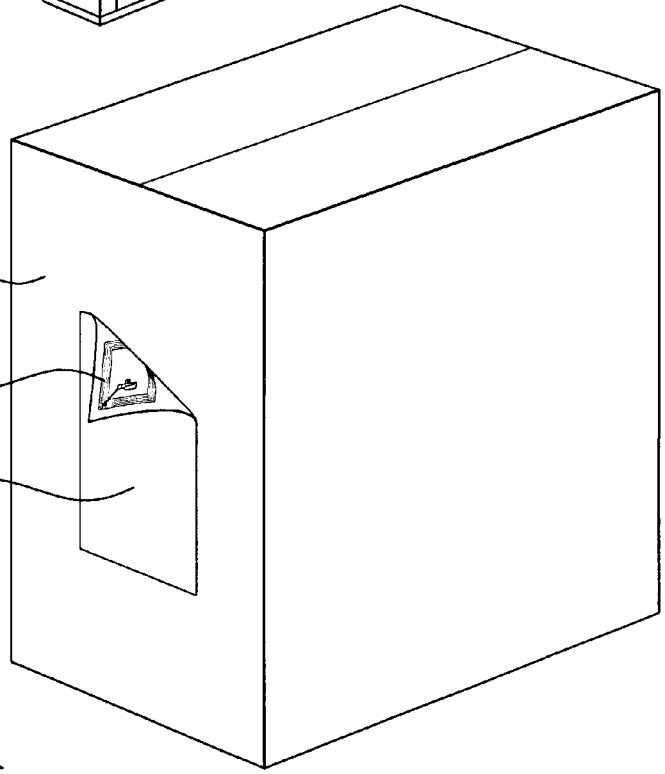
FIG. 3A is a close-up view of a package from FIG. 3 that bears an RFID-containing label.

FIG. 3 illustrates yet another embodiment of the present invention. In FIG. 3, a plurality of boxes 42 are associated on a common pallet 44. Each box has a label 46 affixed to the outer portion thereof. Box 42a (see FIG. 3A for close-up view) bears an RFID tag-containing label 46a. All other boxes on pallet 44 bear labels 46 which do not contain RFID tags. The location of the entire pallet may be tracked by the RFID tag 48 contained on label 46a in a manner very similar to that described above with respect to box 38.

Figure 4:
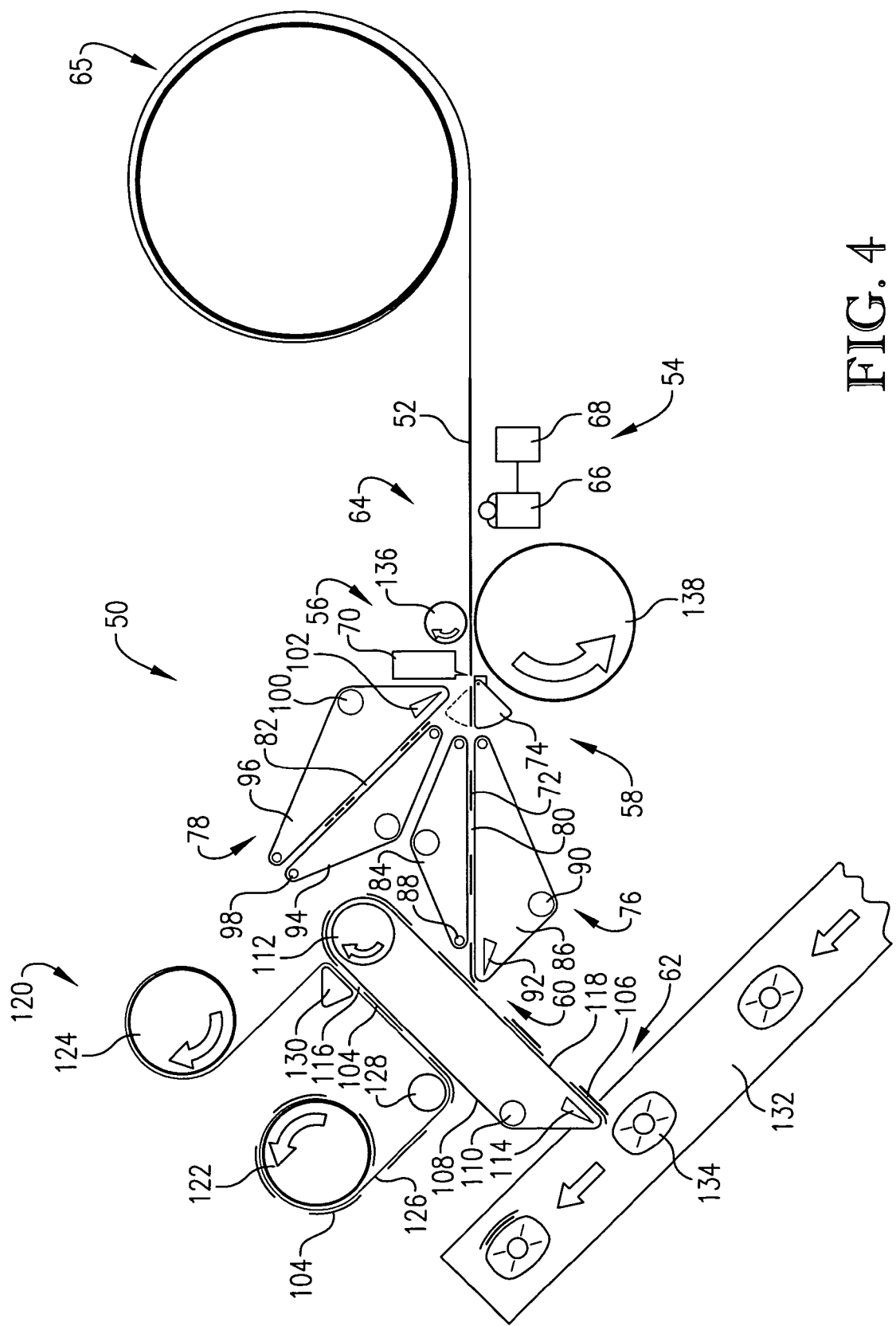
FIG. 4 is an essentially schematic illustration of preferred apparatus for the on-line production and application of RFID-bearing labels.

FIG. 4 illustrates preferred apparatus 50 for the creation and application of EAS-bearing label composites to individual end products. Broadly speaking, the apparatus 50 is designed to receive and process a series of EAS devices (preferably RFID tags) imprinted or otherwise supported on an elongated web 52. The apparatus 50 comprises an EAS interrogation station 54, cutting station 56, web guiding station 58, an EAS-label marrying station 60, and a product labeler 62. The apparatus 50 further has web shifting apparatus 64 designed to move the web 50 from a roll or other supply 65 thereof through the apparatus 50.

The interrogation station 60 in preferred forms includes a convention RFID reader-writer 66 which is positioned adjacent the path of travel of web 52 as shown. The reader-writer 66 is operable to interrogate in turn each of the tags supported on web 52 as the web is shifted therepast, in order to determine whether each tag is operable. Additionally, the reader-writer 66 may be programmed so as to deliver product or other information to the respective tags as may be necessary or desirable. As illustrated, the reader-writer 66 is operably coupled with a controller 68 which receives and stores tag information from the reader-writer.

The cutting station 56 may be any one of a number of known devices for sequentially cutting or severing the web 52 between individual EAS devices, such as a laser cutter or, in the embodiment shown, a knife cutter 70. In any case, the cutting station is operable to deliver discrete, previously interrogated devices 72 to the guiding station 58.

Guiding station 58 includes a shiftable diverter element 74 which is movable between individual positions, together with separate assemblies 76 and 78 which define a product application path 80 and a separate waste path 82. The diverter element 74 is a pivotally supported body downstream of cutter 70 and is adapted to receive and guide the discrete EAS devices 72 to either path 80 or 82.

The assembly 76 is made up of two adjacent belts 84 and 86 having juxtaposed runs which cooperatively define the product application path 80. The belt 84 is supported by three rollers 88 situated in a triangular fashion, whereas belt 86 is supported by spaced rollers 90 as well as a peel element 92 at marrying station 60.

The assembly 78 is similar and is made up of two adjacent belts 94 and 96 having proximal runs defining the waste path 82. Belt 94 is supported on triangularly arranged rollers 98 while belt 96 is supported on a pair of rollers 100 and a static element 102 adjacent diverter 74.

In another aspect, the EAS devices may comprise pressure sensitive adhesive applied to one side thereof. In such situation, assemblies 76 and 78 could be replaced with static or vacuum belt devices similar to belt 108 for transport of devices 72.

The marrying station 60 is designed to attach operable EAS devices 72 to corresponding labels 104 in order to create EAS device-label composites 106. To this end, it will be seen that a continuous vacuum belt 108 is provided which is trained around rollers 110 and 112, as well as about static peel element 114, thereby defining a pair of runs 116 and 118. A label supply system 120 is situated adjacent run 116 and includes a pair of powered rollers 122 and 124. The roller 122 supports a supply of spaced labels 104 positioned on a web 126, whereas roller 124 is a take-up roller. The system 120 also includes a roller 128 and static guide block 130 which directs the web 126 along the length of belt run 116. In practice, a vacuum source (not shown) pulls a vacuum through belt 108, thereby causing the individual labels 104 to be transferred from web 126 and onto belt 108 (alternately, a static belt system could be used). Thereafter, the web 126 is wound on take-up roller 124 as shown. The transferred webs carried by the belt 108 are directed around roller 112 towards and into the marrying station 60. At this point, the respective devices 72 are married with corresponding labels 104. This is preferably accomplished by adhering the devices 72 to the adhesive-bearing faces of the labels 104. Such marrying is facilitated by the presence of peel element 92.

The product labeler 62 includes a shiftable belt 132 which supports spaced products (e.g., bottles or cans) 134. The belt 132 is oriented in order to successively deliver products 134 to a labeling location adjacent element 114 where the previously formed composites 106 are applied.

The web shifting apparatus 64 is itself entirely conventional and in the form shown includes a pair of powered nip rollers 136 and 138 which pull the web from supply 65 for passage through the apparatus 50.

In operation, as web 52 is drawn through the apparatus 50, each of the supported devices 72 is first interrogated by the reader-writer 66. Information about this interrogation (i.e., whether the device is operable or inoperable) is transmitted to memory associated with controller 68. If desired, the reader-writer 66 may be employed to upload information (such as product identification) to the devices 72.

Thereafter, the web is advanced and cutter 70 is employed to sever the web 52 between the EAS devices. This is done regardless of the nature of the information obtained for each device at the interrogation station 54. As the devices 72 are cut, they are guided by diverter element 74 toward either product application path 80 or waste path 82; this selection is made based upon the information obtained at interrogation station 54. If an individual EAS device 72 is inoperable, the diverter 74 is shifted to the position shown in phantom in FIG. 4, adjacent the inlet of path 82. The belts 94 and 96 thereupon grasp and move the inoperable device 72 toward the outlet of the path 82 where waste devices are collected by any conventional means. Alternately, if a given device 72 is found to be operable in station 54, the diverter is shifted to its full line position adjacent the inlet of path 80. In this instance, the EAS device is transferred along path 80 by virtue of the movement of belts 84 and 86 to marrying station 60. At this point, owing to the presence of the peel element 92, each EAS device is separated from the belts and is transferred to the adhesive-bearing face of a corresponding label 104 in order to create an EAS device-label composite 106. Of course, the belt 108 is moved in timed relationship so as to present a label 106 at the instant when a device 72 is separated from the transfer belt assembly. The finished composites 106 are then transferred to the labeler 62 for application to respective products 134 in the conventional manner.

Although not shown in detail, it will be appreciated that the controller 68 (or perhaps a plurality of controllers) is employed to control the overall operation of apparatus 50 in order to achieve the ends of the invention. Of particular import is the need to coordinate the movement of the belt 108 with the presentation of operable devices 72 at marrying station 60, i.e., the belt 108 must be slowed or stopped to accommodate instances where inoperative devices 72 are diverted along path 82, thereby forming a "gap" in the train of operative devices delivered to marrying station 60. The implementation and programming of an appropriate control system is well within the skill of the art.

The forgoing apparatus illustrated in FIG. 4 can be modified so as to produce an on-demand label system. In one aspect, the EAS device supply roll 65 can be replaced with an EAS device fabrication station whereby the devices are manufactured and immediately directed to apparatus 50 for creation and application of EAS-bearing labels. Likewise, label supply system 120 could be replaced with a system for on-demand production of printed images such as that illustrated in U.S. Pat. No. 6,598,531. This modified, on-demand system provides tremendous flexibility and allows for rapid changeover between different types of products 134. For example, otherwise identical bottles of liquid detergent may bear different labels depending upon the distributer thereof. Conventionally, switching over from one label to another would require taking the entire labeling system off line so that a different spool of prefabricated labels could be loaded onto the labeling apparatus. In an on-demand system, the controllers can instruct the image printing device to discontinue production of one label and immediately initiate production of another. In this way, belt 132 transporting products 134 need not be halted for this changeover and the flow of product can continue uninterrupted.

I claim:

1. A method for the production and application of an EAS-bearing labels comprising the steps of:
   providing a supply of spaced apart EAS devices supported on an elongated web;
   moving said web through an interrogation station and a cutting station, in order to ascertain whether each of said devices is operable in said interrogation station, and to cut said web to thereby create discrete EAS devices in said cutting station;
   alternately directing each EAS device along a product application path if the device is operable, or along a waste path if the device is inoperable;
   marrying said operable devices directed along said product application path to corresponding product labels to form EAS label composites; and
   applying said composites to respective products.

2. The method of claim 1, said EAS devices being RFID tags.

3. The method of claim 1, said interrogation station being positioned upstream of said cutting station so that said devices are interrogated prior to cutting of said web.

4. The method of claim 1, said EAS devices being RFID tags, said interrogation station comprising an RFID reader-writer.

5. The method of claim 4, including the step of writing information to at least certain of said RFID tags in said interrogation station.

6. The method of claim 1, said cutting station comprising a selectively operable cutting blade for severing said web to create said discrete EAS devices.

7. The method of claim 1, including the step of using a guiding station including a shiftable diverter element and separate belt assemblies defining said product application path and said waste path, respectively; said element alternately shiftable between individual positions adjacent the inputs of said product application and waste paths in order to deliver discrete devices thereto.

8. The method of claim 7, including the step of transmitting information derived from said interrogation station regarding the operability of respective EAS devices to a controller, and shifting said diverter element between said individual positions in response to said transmitted information.

9. The method of claim 1, said marrying step comprising the step of applying a discrete, operable EAS device to the adhesive-bearing face of a corresponding product label.

10. The method of claim 9, including the step of moving individual labels past the output of said product application path, and carrying out said marrying step adjacent said output.

11. The method of claim 9, including the step of shifting said EAS label composites, and applying each of the composites to a respective product.

12. Apparatus for the production and application of EAS-bearing labels comprising:
   an EAS interrogation station;
   a cutting station;
   web-shifting apparatus operable to shift an elongated web having spaced apart EAS devices supported thereon into and through said interrogation and cutting stations in order to permit interrogation of each of said devices in said interrogation station to determine the operability thereof, and to cut said web and thereby create discrete EAS devices in said cutting station;
   a web guiding station downstream of said culling station and comprising a shiftable diverter element and separate assemblies defining a product application path and a waste path respectively, said element alternately shiftable between individual positions adjacent the inputs of said product application and waste paths in order to deliver discrete devices thereto;
   a marrying station adjacent the output of said product application path in order to marry operable EAS devices directed along the product application path to corresponding product labels to form EAS label composites; and
   a product labeler operable to receive said EAS label composites and to apply each composite to a respective product.

13. The apparatus of claim 12, said EAS devices being RFID tags, said interrogation station comprising an RFID reader-writer.

14. The apparatus of claim 13, said reader-writer operable to write information to at least certain of said RFID tags in said interrogation station.

15. The apparatus of claim 12, said cutting station comprising a selectively operable cutting blade for severing said web to create said discrete EAS devices.

16. The apparatus of claim 12, said product application and waste paths including respective belt assemblies.

17. The apparatus of claim 12, including a controller operably coupled with said interrogation station for receiving information therefrom regarding the operability of respective EAS devices.

* * * * *